US008989497B2

(12) United States Patent
Araumi

(10) Patent No.: US 8,989,497 B2
(45) Date of Patent: Mar. 24, 2015

(54) HANDWRITTEN CHARACTER INPUT DEVICE, REMOTE DEVICE, AND ELECTRONIC INFORMATION TERMINAL

(71) Applicant: Mayuka Araumi, Tokyo (JP)

(72) Inventor: Mayuka Araumi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 264 days.

(21) Appl. No.: 13/724,566

(22) Filed: Dec. 21, 2012

(65) Prior Publication Data
US 2013/0162606 A1 Jun. 27, 2013

(30) Foreign Application Priority Data

Dec. 27, 2011 (JP) ................................. 2011-286578

(51) Int. Cl.
*G06K 9/00* (2006.01)
*G06F 3/041* (2006.01)
*G06F 3/0488* (2013.01)

(52) U.S. Cl.
CPC ............ *G06F 3/041* (2013.01); *G06F 3/04883* (2013.01); *G06K 9/00409* (2013.01)
USPC ........... 382/189; 382/181; 382/186; 382/187; 382/188; 382/202

(58) Field of Classification Search
CPC . G06K 9/222; G06F 3/20219; G06F 3/04883; G06F 1/162; G06F 1/1643; G06F 1/1679
USPC ......... 382/181, 186, 187, 188, 189, 190, 200, 382/201, 202, 203, 217; 348/333.01; 345/179
See application file for complete search history.

(56) References Cited

U.S. PATENT DOCUMENTS

| 5,870,492 A * | 2/1999 | Shimizu et al. ............... 382/187 |
|---|---|---|
| 6,072,474 A | 6/2000 | Morimura et al. |
| 2002/0071607 A1* | 6/2002 | Kawamura et al. ........... 382/187 |
| 2006/0088216 A1* | 4/2006 | Kawamura et al. ........... 382/187 |
| 2008/0186396 A1* | 8/2008 | Nakajima et al. ........ 348/333.01 |

FOREIGN PATENT DOCUMENTS

| JP | 07-325658 | 12/1995 |
|---|---|---|
| JP | 09-091076 | 4/1997 |
| JP | 09-097311 | 4/1997 |
| JP | 2000-003407 | 1/2000 |
| JP | 2002-175498 | 6/2002 |
| JP | 2006-331258 | 12/2006 |

(Continued)

*Primary Examiner* — Ali Bayat
(74) *Attorney, Agent, or Firm* — Harness, Dickey & Pierce, P.L.C.

(57) ABSTRACT

A handwritten character input device includes a correction amount computation unit which performs, when a characteristic value of handwritten characters input to a designated character writing area of a template image by a handwriting input operation of a user does not meet predetermined character writing requirements, a computation process that computes a correction amount of the characteristic value required to meet the character writing requirements; and a corrected handwritten character information output unit which outputs information of after-correction handwritten characters generated based on the correction amount computed by the correction amount computation unit, the characteristic value of the after-correction handwritten characters meeting the character writing requirements.

12 Claims, 12 Drawing Sheets

(56) References Cited

FOREIGN PATENT DOCUMENTS

| JP | 2009-086769 | 4/2009 |
|----|-------------|--------|
| JP | 2009-193145 | 8/2009 |
| JP | 2011-022707 | 2/2011 |
| JP | 2011-160482 | 8/2011 |

* cited by examiner

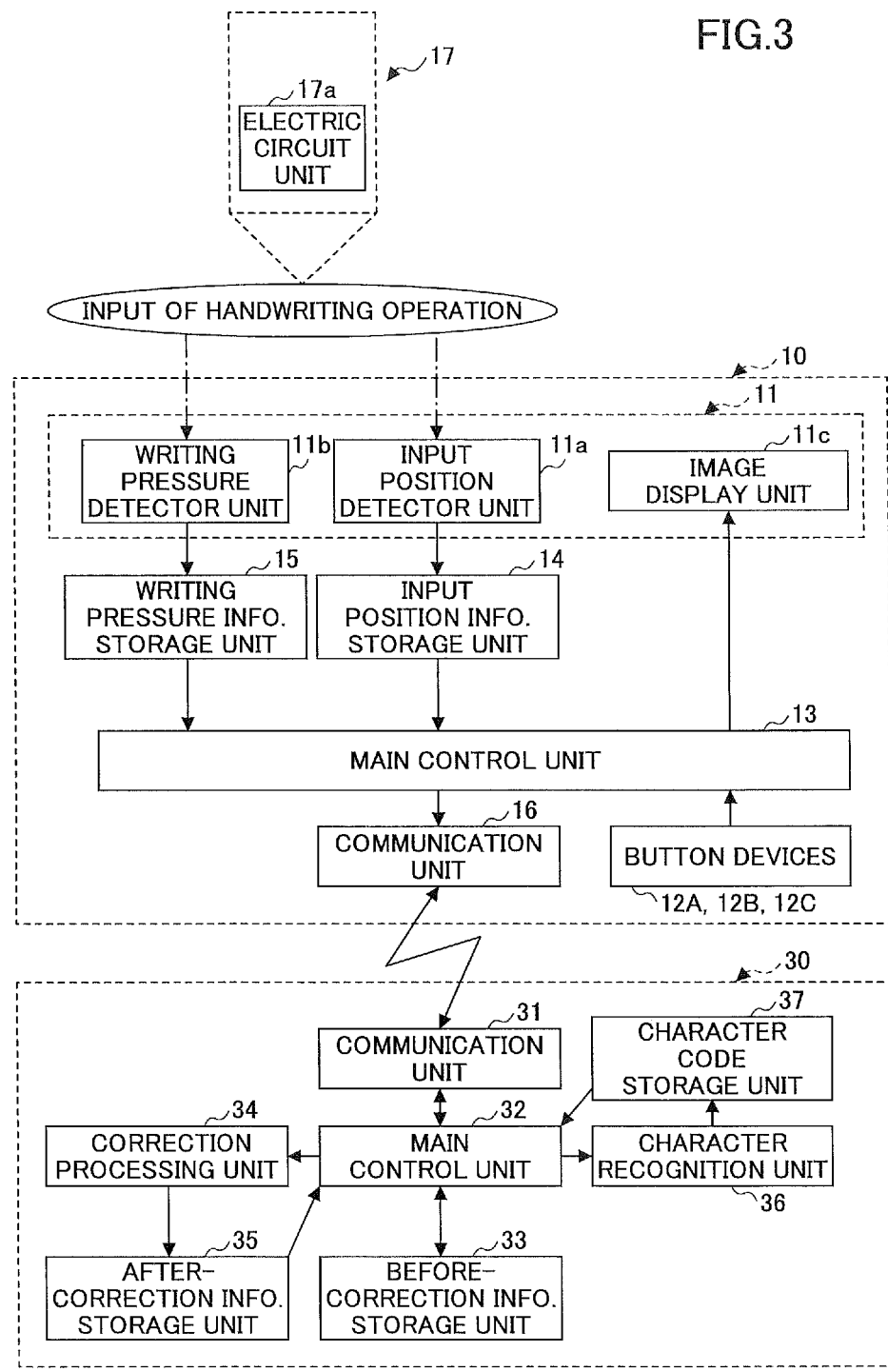

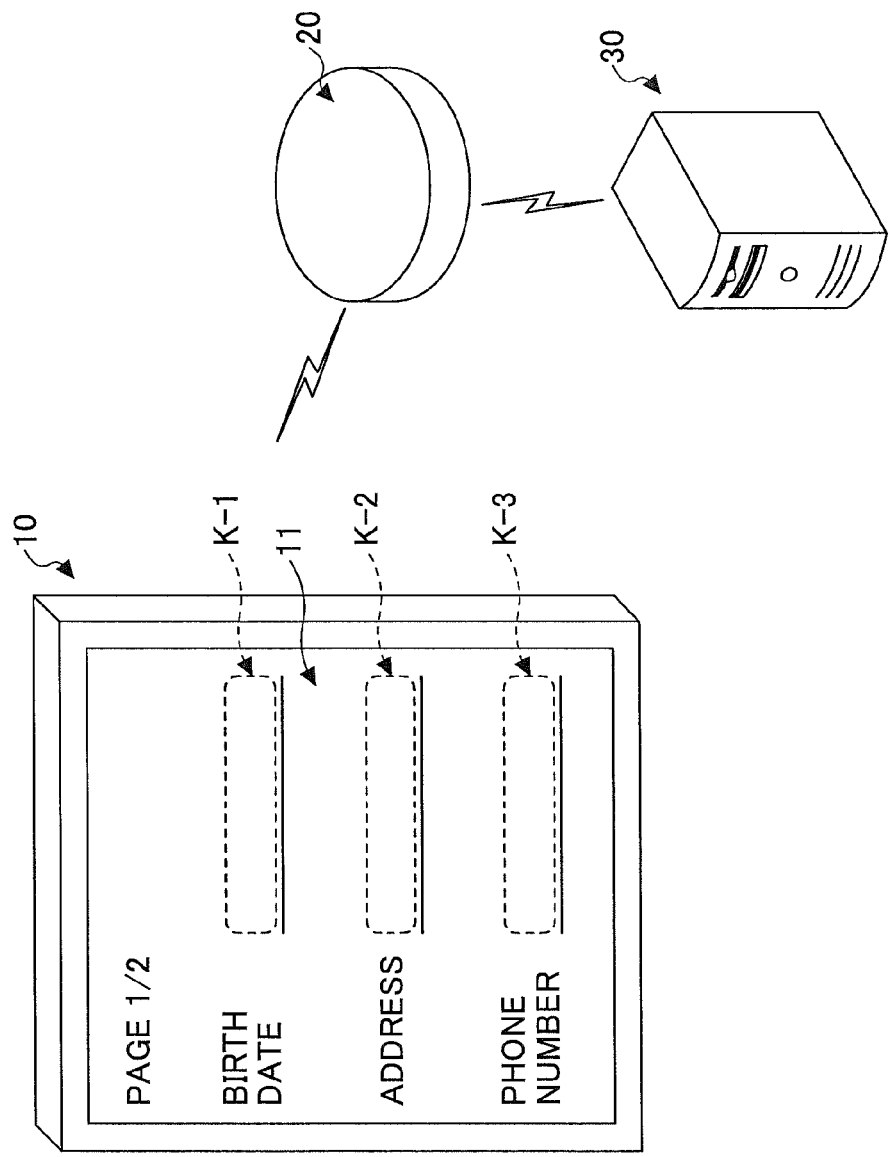

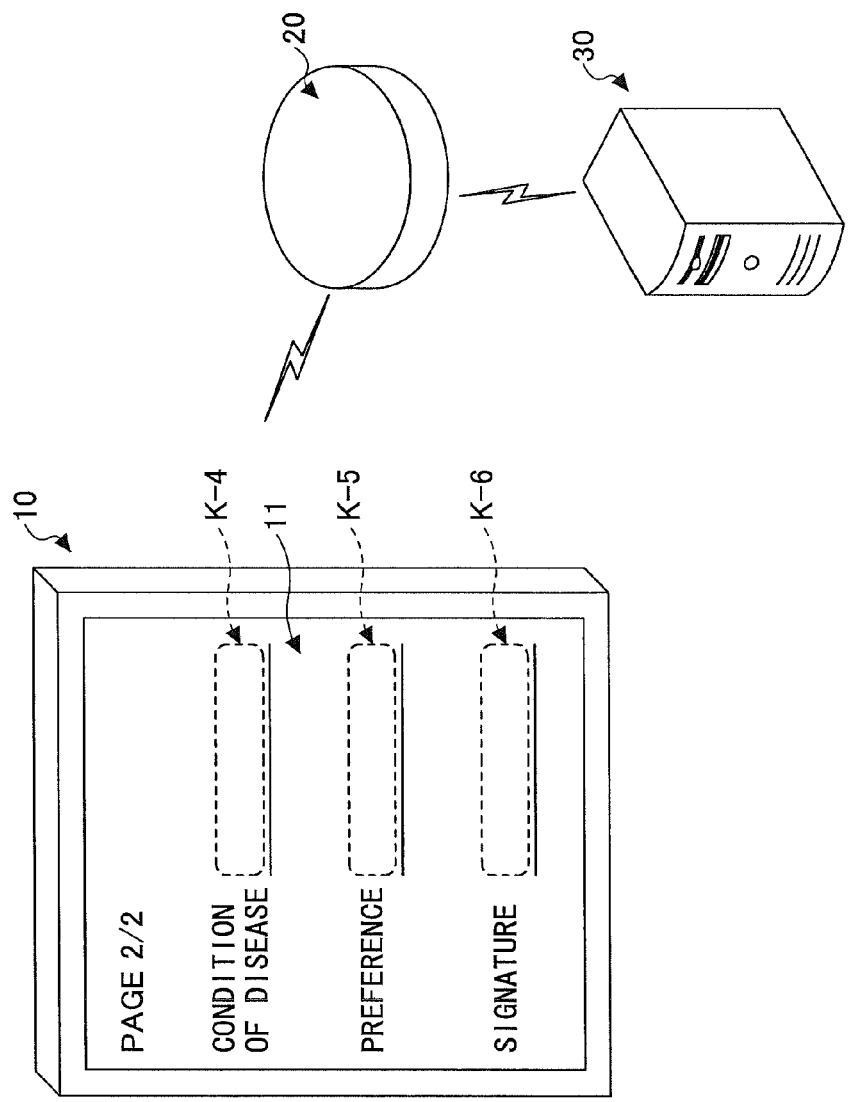

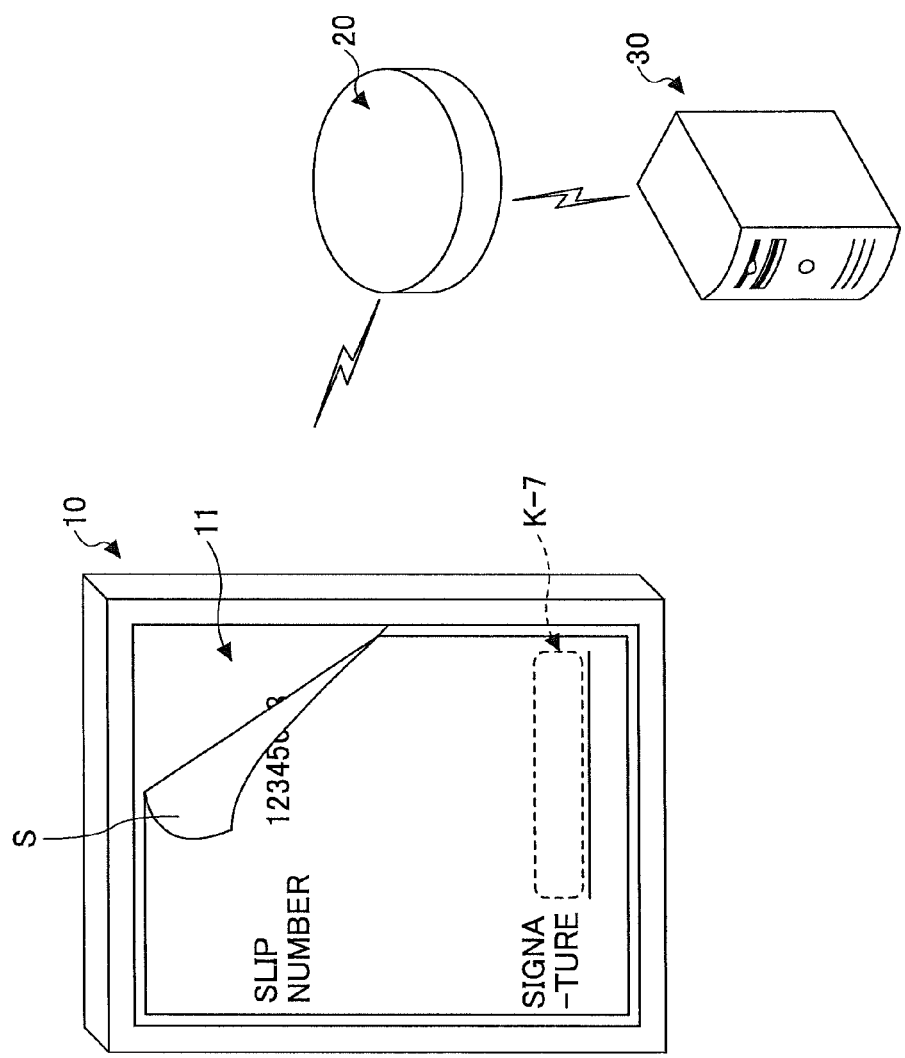

HANDWRITTEN CHARACTER INPUT DEVICE, REMOTE DEVICE, AND ELECTRONIC INFORMATION TERMINAL

BACKGROUND OF THE INVENTION

1. Field of the Invention

The present disclosure relates to handwritten character input devices which are adapted for inputting handwritten characters by handwriting input operation of the user, and relates to remote devices and electronic information terminals for use with handwritten character input devices.

2. Description of the Related Art

There are many instances in which a user fills in a routine document format and creates a document, in various fields. The demand for generating electronic data from many documents created in this way in order to facilitate the document management is increasing. In the following, generating electronic data from such handwritten documents will be called electronization. Conventionally, in such instances, the user often uses a writing tool to write characters or the like on a recording sheet (sheet material) in which a routine document format is printed beforehand. In this case, in order to generate electronic data, an operator must perform complicated electronization work, such as performing a manual input operation with a keyboard while viewing the characters filling in the recording sheet, or optically reading the recording sheet with an image reader, which was inconvenient for the operator.

Conventionally, there has been a system in which an image (template image) of a document format is displayed on a display unit of a personal computer or a word processor, and a user is prompted to input characters into a character writing area of the template image using a keyboard. However, the system was inconvenient for a user unfamiliar with the keyboard operation. Moreover, it was necessary for the conventional system that the display unit for displaying the template image and the keyboard for inputting information by the user be separately arranged. A workspace which is large enough to arrange the display unit and the keyboard was needed. If the handwritten data were information important to identify the user, such as a signature, it was difficult to safely manage such information with the conventional system.

On the other hand, there has been also a handwritten character input device which generates a combined image of a template image and a handwritten character image if a user manually writes characters on a display screen (operation surface) on which the template image is displayed. For example, Japanese Laid-Open Patent Publication No. 2011-22707 discloses an image writing system which includes a server, a writing device connected to the server to perform communications with the server, and a display medium detachably attached to the writing device. In this image writing system, the display medium is attached to the writing device so that a displaying area of the display medium is placed below a transparent touch panel provided in the writing device, and an image of an image file received from the server is written in the display medium by the writing device.

Thereby, the user can visually recognize the image displayed on the displaying area of the display medium through the transparent touch panel. If the user in this state performs a handwriting operation to draw a handwritten character on the touch panel using a stylus pen, the locus of the input positions generated by the handwriting operation is stored in the writing device. Then, the handwritten character image based on the stored information in the writing device is combined with the image currently displayed in the displaying area of the display medium, and the combined image is displayed.

Thus, if the handwritten character input device is able to input handwritten characters when the handwriting input operation is performed by the user and the input characters are displayed in the display screen on which the template image is displayed, it is no longer necessary for the user to perform the complicated electronic work. The convenience of the user may be increased with respect to the following point.

That is, the user can input the handwritten character information by performing only the manual operation which is the same as that in the case where characters are written on paper with a writing tool. The information inputting work will not be burdensome to the user, and the convenience for the user who is unfamiliar with the keyboard operation will be increased. Because the keyboard operation is unnecessary, the handwritten character input device can contribute to the reduction of the needed workspace. Moreover, it is possible to manage the information handwritten by the user directly, and it is possible to safely manage the important information, such as a signature.

However, it is expected that, when the user inputs the information to be input to the character writing area of the template image by the handwriting input operation, the handwritten characters may be input to the character writing area in an unsuitable manner. For example, when a sheet member, such as a recording sheet, in which a template image is printed, is overlaid on the display screen in which the same template image is displayed and the handwriting input operation is performed on the sheet member using a writing tool, the input of information of the handwritten characters and creation of the sheet member on which the handwritten characters are written can be performed at once. This is useful for a case in which a duplicate of the handwritten document must be passed to the user who has performed the handwriting input operation on the spot (such as an instance of receiving a signature of a user for the certificate of delivery by a parcel delivery service or mail).

However, if the sheet member is overlaid on the display screen in an unsuitable manner, the position of the input handwritten characters in the character writing area of the sheet member may project from the character writing area of the display screen. Or, the direction of the input handwritten characters in the character writing area of the sheet member may be inclined to that of the character writing area of the display screen. Moreover, the size of the input handwritten characters in the character writing area of the sheet member may be too small or too large relative to the size of the character writing area of the display screen. In this manner, the handwritten characters may be input to the character writing area in an unsuitable manner.

Furthermore, when prior calibration is not performed appropriately, the input position may not be detected appropriately even if the user performs the handwriting input operation appropriately in the character writing area, but it may be recognized as a wrong input position shifted from the actual input position. Also in such a case, the handwritten characters may be input to the character writing area in an unsuitable manner.

If the handwritten characters are input to the character writing area of the template image in an unsuitable manner, the following problems may arise.

There is a case in which the template image in which the handwritten characters input by the user by the handwriting input operation are entered in the template image is displayed on the display unit or printed out on a recording sheet. In such a case, the appearance of the screen displayed on the display unit or the printed document will be poor if the handwritten characters are input to the character writing area of the template image in an unsuitable manner.

There is also a case in which only the information input to a specific character writing area of the template image by the handwriting input operation is extracted and data processing of such information is performed. In such a case, the data processing cannot be performed appropriately if the handwritten characters are input to the character writing area of the template image in an unsuitable manner.

SUMMARY OF THE INVENTION

In one aspect, the present disclosure provides a handwritten character input device which is able to reduce or resolve the above-mentioned problems even if the handwritten characters are input to the character writing area of the template image in an unsuitable manner.

In an embodiment which solves or reduces one or more of the above-mentioned problems, the present disclosure provides a handwritten character input device including: a handwriting operation input unit having an operation surface where a handwriting input operation is performed by a user and configured to output input position information indicating an input position where the handwriting input operation is performed on the operation surface; an image display unit configured to display a template image on the operation surface of the handwriting operation input unit, the template image including a character writing area designation image to designate a character writing area where handwritten characters are to be input by the handwriting input operation; an input position information storage unit configured to receive, from the handwriting operation input unit, the input position information of the handwritten characters where the handwriting input operation is performed, and to store the input position information therein; a correction amount computation unit configured to perform, when at least one of handwritten character characteristic values, including a position, an inclination and a size, of handwritten characters input to the designated character writing area by the handwriting input operation does not meet predetermined character writing requirements, a correction amount computation process that computes a correction amount of the at least one handwritten character characteristic value required to meet the character writing requirements; and a corrected handwritten character information output unit configured to output information of after-correction handwritten characters generated based on the correction amount computed by the correction amount computation unit, the at least one handwritten character characteristic value of the after-correction handwritten characters meeting the character writing requirements.

Other objects, features and advantages of the present disclosure will become more apparent from the following detailed description when read in conjunction with the accompanying drawings.

BRIEF DESCRIPTION OF THE DRAWINGS

FIG. 3 is a block diagram showing the major composition of the document management system of the present embodiment.

FIG. 4A and FIG. 4B are diagrams showing examples of document format images displayed on the electronic information terminal in the present embodiment.

FIG. 14 is a diagram for explaining a use mode of an instance which inputs a signature to a signature portion of a slip paper using an electronic pen having a writing tool function, the slip paper overlaid on a display screen of a touch panel of the electronic information terminal of the present embodiment.

DETAILED DESCRIPTION OF THE PREFERRED EMBODIMENTS

A description will be given of embodiments of the present disclosure with reference to the accompanying drawings.

One embodiment of a handwritten character input device will be described according to the present disclosure, which is applied to a document management system including an electronic information terminal, an electronic pen, and a server that is a remote device.

Figure 1:
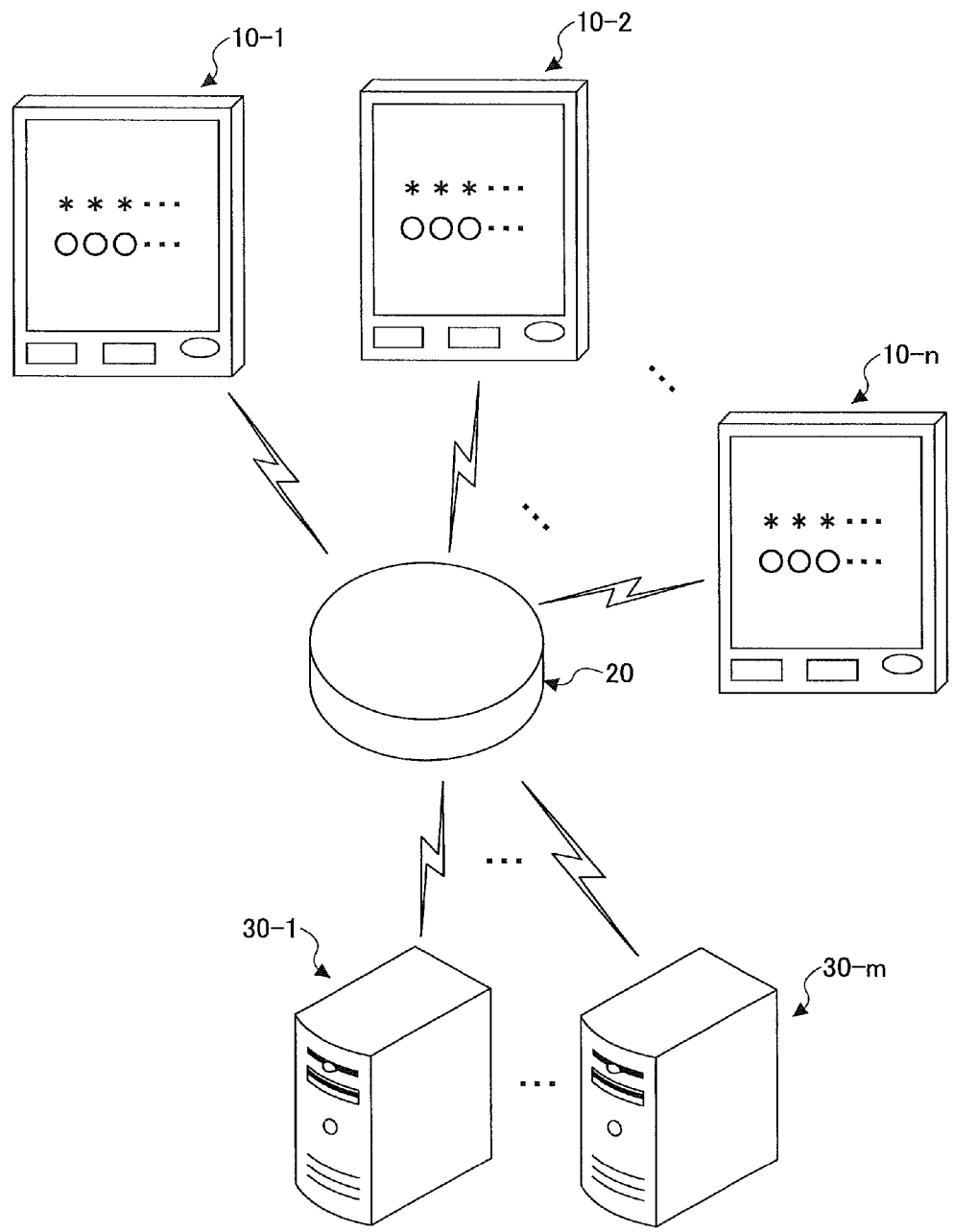
FIG. 1 is a diagram showing the outline composition of a document management system of an embodiment of the present disclosure.

FIG. 1 is a diagram showing the outline composition of the document management system of the present embodiment. As shown in FIG. 1, in this document management system, plural electronic information terminals 10-1 through 10-*n* (n: a natural number) are connectable to at least one of servers 30-1 through 30-*m* (m: a natural number) via a communication network 20 for performing communications.

Specific information (for example, handwritten character data) to be transmitted to any of the servers 30-1 through 30-*m*, included in the information input to any one of the electronic information terminals 10-1 through 10-*n*, is transmitted from the one electronic information terminal to a corresponding one of the servers 30-1 through 30-*m* via the communication network 20. On the other hand, required information (for example, an evaluation result of the handwritten character data) is appropriately transmitted from the corresponding one of the servers 30-1 through 30-*m* to the one of the electronic information terminals 10-1 through 10-*n*. Various processes performed by the servers 30-1 through 30-*m* may be distributed over the servers 30-1 through 30-*m* appropriately, or may be performed by a single server in a concentrated manner.

Figure 2:
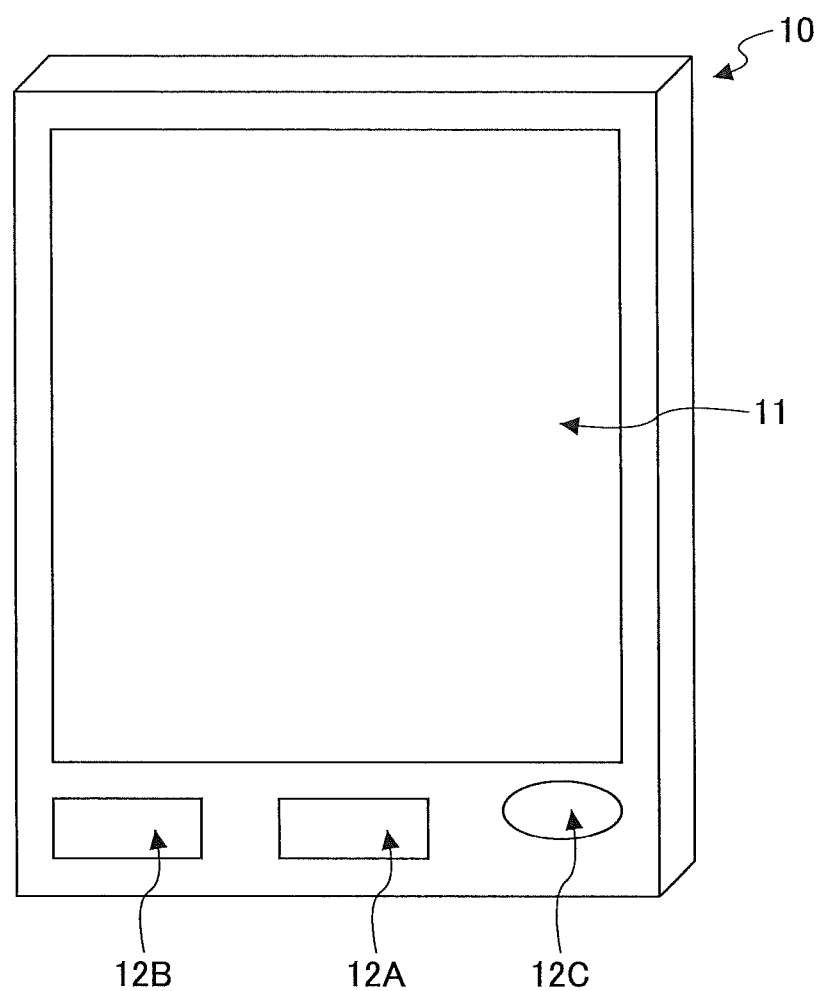
FIG. 2 is a perspective view showing the appearance of an electronic information terminal for use in the document management system of the present embodiment.

FIG. 2 is a perspective view showing the appearance of an electronic information terminal for use in the document management system of the present embodiment.

As shown in FIG. 2, this electronic information terminal 10 includes a touch panel 11 and three button devices 12A, 12B and 12C arranged below the touch panel 11.

In this electronic information terminal 10, a known touch panel which outputs position information (X and Y coordinate data) of a contact position (input position) on an image display surface if a user's fingertip or a dedicated electronic pen is in contact with the image display surface (operation surface) may be used as the touch panel 11. An existing touch panel having a memory unit or an existing nonvolatile touch panel may be used for the touch panel 11 of the present embodiment. The touch panel having the memory unit or the existing nonvolatile touch panel used for the present embodiment may be a touch panel which retains its screen display when the power is turned off (without electric power supply). Alternatively, a touch panel which cannot retain its screen display when the power is turned off may be used as the touch panel 11.

Next, the composition of the document management system of the present embodiment will be described with reference to a case where a user performs a handwriting input operation on a document format, such as an interview sheet, in which answering a questionnaire is demanded in a medical institution, etc.

FIG. 3 is a block diagram showing the major composition of the document management system of the present embodiment.

As shown in FIG. 3, in the electronic information terminal 10 which constitutes part of the document management system of the present embodiment, a touch panel 11 is provided. This touch panel 11 includes an input position detector unit 11*a* (which is a handwriting operation input unit), a writing pressure detector unit 11*b* (which is an operation pressure detector unit), and an image display unit 11*c* (which is an image display unit).

The electronic information terminal 10 further includes three button devices 12A, 12B and 12C, a main control unit 13, an input position information storage unit 14, a writing pressure information storage unit 15, and a communication unit 16.

When a user causes an electronic pen 17 to contact an image display surface (operation surface) of the touch panel 11, the input position detector unit 11*a* of the touch panel 11 detects the contact position on the image display surface (input position), and outputs the position information (X and Y coordinate data). Any of a resistance film method, an electromagnetic induction method, a capacitive sensing method, etc., may be used as the method of detecting a contact position on the image display surface. However, the electronic pen 17 which is prepared to be in conformity with the method of detection used in the touch panel 11 must be used.

When the case is expected in which the handwriting input operation is to be performed in a state where a recording sheet (sheet material) is overlaid on the image display surface, it is preferred to adopt the resistance film method or the electromagnetic induction method among these detection method.

In the present embodiment, the electromagnetic induction method is adopted, which will be described below.

The electronic pen 17 of the present embodiment is used in combination with the input position detector unit 11*a* of the touch panel 11 and employs a known function of detecting writing pressure. For example, the function of detecting writing pressure as disclosed in Japanese Laid-Open Patent Publication No. 07-325658 or Japanese Laid-Open Patent Publication No. 09-091076 may be adopted.

In the electronic pen 17 of the present embodiment, the composition in which pressure (a writing pressure) exerted on the tip of the electronic pen 17 is detected by a piezoelectric device is adopted. However, the composition in which the writing pressure is detected is not indispensable to the present embodiment.

The input position detector unit 11*a* of the touch panel 11 is formed by a coil array which includes a number of coils arranged in the back of the display panel which forms the image display unit 11*c*. The coil array operates to alternately perform transmitting operation which causes the coils to generate a magnetic field, and a receiving operation which causes the coils to generate a voltage in accordance with a change of the external magnetic field.

The electric circuit unit 17*a* of the electronic pen 17 includes a pen side coil which generates a voltage in response to a change of the magnetic field generated by the transmitting operation of the coil array of the touch panel 11. The pen side coil generates a magnetic field by the voltage which has been generated during the transmitting period, for the receiving period the receiving operation is performed by the coil array of the touch panel 11. The coil array of the touch panel 11 generates a voltage in accordance with a change of the magnetic field generated by the pen side coil of the electronic pen 17. At this time, the coil of the coil array of the touch panel 11 nearest to the pen side coil generates the highest voltage, and this highest voltage is detected by the input position detector unit 11*a* so that the contact position of the electronic pen 17 (input position) is detected. The input position detector unit 11*a* stores the X and Y coordinate data of the thus detected input position into the input position information storage unit 14 as input position information continuously in time sequence.

When the electronic pen 17 is in contact with the touch panel 11, pressure (the writing pressure) is exerted on the tip of the electronic pen 17. The piezoelectric device, arranged in the electric circuit unit 17*a* of the electronic pen 17, generates a voltage in accordance with the magnitude of the writing pressure. At least a part of the voltage signal generated by the pen side coil during the receiving period is modulated in accordance with the voltage of the piezoelectric device, and a change of the magnetic field modulated according to the magnitude of the writing pressure is produced. The coil array of the touch panel 11 generates, in response to the magnetic field change, the voltage modulated in accordance with the magnitude of the writing pressure. This voltage signal is demodulated by the writing pressure detector unit 11*b* of the touch panel 11, so that the magnitude of the writing pressure is detected in the electronic information terminal 10. The writing pressure detector unit 11*b* stores the thus detected writing pressure information into the writing pressure information storage unit 15 as operation pressure information continuously in time sequence.

Under control of the main control unit 13, the image display unit 11*c* of the touch panel 11 displays a document format image (template image) on the image display surface of the touch panel 11, based on the document format information, as shown in FIG. 4A or FIG. 4B. The document format image in the present embodiment includes character writing area designation images (the segment images displayed under the areas indicated by the dotted lines in FIG. 3) to designate the character writing areas (the areas K-1 to K-6 indicated by the dotted lines in FIGS. 4A and 4B) where the user should input handwritten characters by the handwriting input operation. Hence, the user can easily recognize a position of the document format image and a type of information for which the user should input handwritten characters by the handwriting input operation.

When the user performs the handwriting input operation to write handwritten characters in the character writing areas K-1 to K-6 on the image display surface using the electronic pen 17, handwriting point images are continuously displayed at the position that is almost the same as the position where the tip of the electronic pen 17 contacts the image display surface of the touch panel 11 by the handwriting input operation simultaneously with the time of the contact. An image of a handwritten character including a large number of the handwriting point images which are continuously displayed will be displayed on the touch panel 11.

Almost simultaneously with the time the handwriting input operation is performed by the user, the handwriting point images are displayed at the almost same position as the input position on the touch panel 11, and the user can write the handwritten characters on the touch panel 11 similar to the case where the characters are written on paper by hand with a usual writing tool, such as a pencil.

Each of the button devices 12A, 12B and 12C is arranged to have the corresponding function (a result of button operation) which is set up appropriately by execution of a control program (a computer program) on the electronic information terminal 10. The button devices 12A, 12B and 12C in the present embodiment are arranged to operate as in the following, during execution of a handwriting input program which will be described later. During execution of the handwriting input program, the first button device 12A functions as a page skip button, the second button device 12B functions as a page return button, and the third button device 12C functions as a data transmission button that directs transmission of predetermined information (data) to a server.

The main control unit 13 performs processing and control of the electronic information terminal 10 in a concentrated manner. The main control unit 13 includes a memory which stores various programs, and a CPU (central processing unit) which executes the programs and performs various data processing or controls hardware resources of the electronic information terminal 10 in accordance with the programs executed.

Specifically, the main control unit 13 receives the input position information stored in time sequence in the input position information storage unit 14, and the writing pressure information stored in time sequence in the writing pressure information storage unit 15. Based on the received input position information and the received writing pressure information, the main control unit 13 causes the image display unit 11c of the touch panel 11 to display the image of the handwritten characters (including the handwriting point images). Moreover, when performing a handwritten character correction process (which will be described later), the main control unit 13 causes the communication unit 16 to transmit the received input position information and the received writing pressure information to the server 30 as associated information (metadata) of the document format information corresponding to the document format image currently displayed on the image display surface of the touch panel 11.

In the following, the associated information of the document format information will be called handwritten character information.

Moreover, when a result of the handwritten character correction process from the server 30 is received at the communication unit 16, the main control unit 13 causes the image display unit 11c of the touch panel 11 to display the image of the corrected handwritten characters after the correction process together with the document format image.

The server 30 in the present embodiment is provided with the following: a communication unit 31 to communicate with the electronic information terminal 10; a main control unit 32 to control processing and operation of the server 30 in a concentrated manner; a before-correction information storage unit 33 to store the handwritten character information received at the communication unit 31; a correction processing unit 34 to perform a handwritten character correction process of the handwritten character information; an after-correction information storage unit 35 to store the handwritten character information obtained after the correction process is performed by the correction processing unit 34; a character recognition unit 36 to recognize each of the handwritten characters (by detecting a corresponding character code of each handwritten character); and a character code storage unit 37 to store the character code of each of the handwritten characters recognized by the character recognition unit 36.

The main control unit 32 performs processing and control of the server 30 in a concentrated manner. The main control unit 32 includes a memory which stores various programs and a CPU (central processing unit) which executes various programs and performs various data processing or controls hardware resources of the server 30 in accordance with the programs executed.

Specifically, the main control unit 32 stores the before-correction handwritten character information received at the communication unit 31 into the before-correction information storage unit 33. The main control unit 32 sends the before-correction handwritten character information received at the communication unit 31 to the correction processing unit 34 and causes the correction processing unit 34 to perform the handwritten character correction process of the handwritten character information. The main control unit 32 causes the communication unit 31 to transmit the after-correction handwritten character information stored in the after-correction information storage unit 35 to the electronic information terminal 10, or sends the after-correction handwritten character information to the character recognition unit 36 and causes the character recognition unit 36 to perform the character recognition process.

The correction processing unit 34 functions as a correction amount computation unit, and performs the handwritten character correction process including a correction amount computation process based on the document format information and its associated information (handwritten character information). In the correction amount computation process performed, a correction amount of any of handwritten character characteristic values of the handwritten character required to meet predetermined character writing requirements is computed. For example, the handwritten character characteristic values indicate a position, an inclination and a size of the handwritten character input to the character writing area of the document format image by the handwriting input operation. When one of the handwritten character characteristic values does not meet the character writing requirements, a correction amount of the characteristic value for meeting the character writing requirements is computed in the correction amount computation process.

The character recognition unit 36 performs the character recognition process based on the associated information of the document format information (handwritten character information) in order to manage the handwritten characters input by the handwriting input operation of the user with the corresponding character codes. In this character recognition process, a known character recognition process may be performed using the input position information of the handwritten characters contained in the handwritten character information. If the writing pressure information of the handwritten characters contained in the handwritten character information is also used, the character recognition process can be performed with a higher level of accuracy. The character codes recognized by the character recognition unit 36 are associated with the document format information and stored into the character code storage unit 37.

By managing the handwritten characters by the character codes, it is possible for the document management system of the present embodiment to quickly extract a questionnaire result in which a specific reply (handwritten characters) is written, from among a lot of questionnaire results (the document format information accompanied with the handwritten character information) by keyword retrieval or the like.

Figure 5:
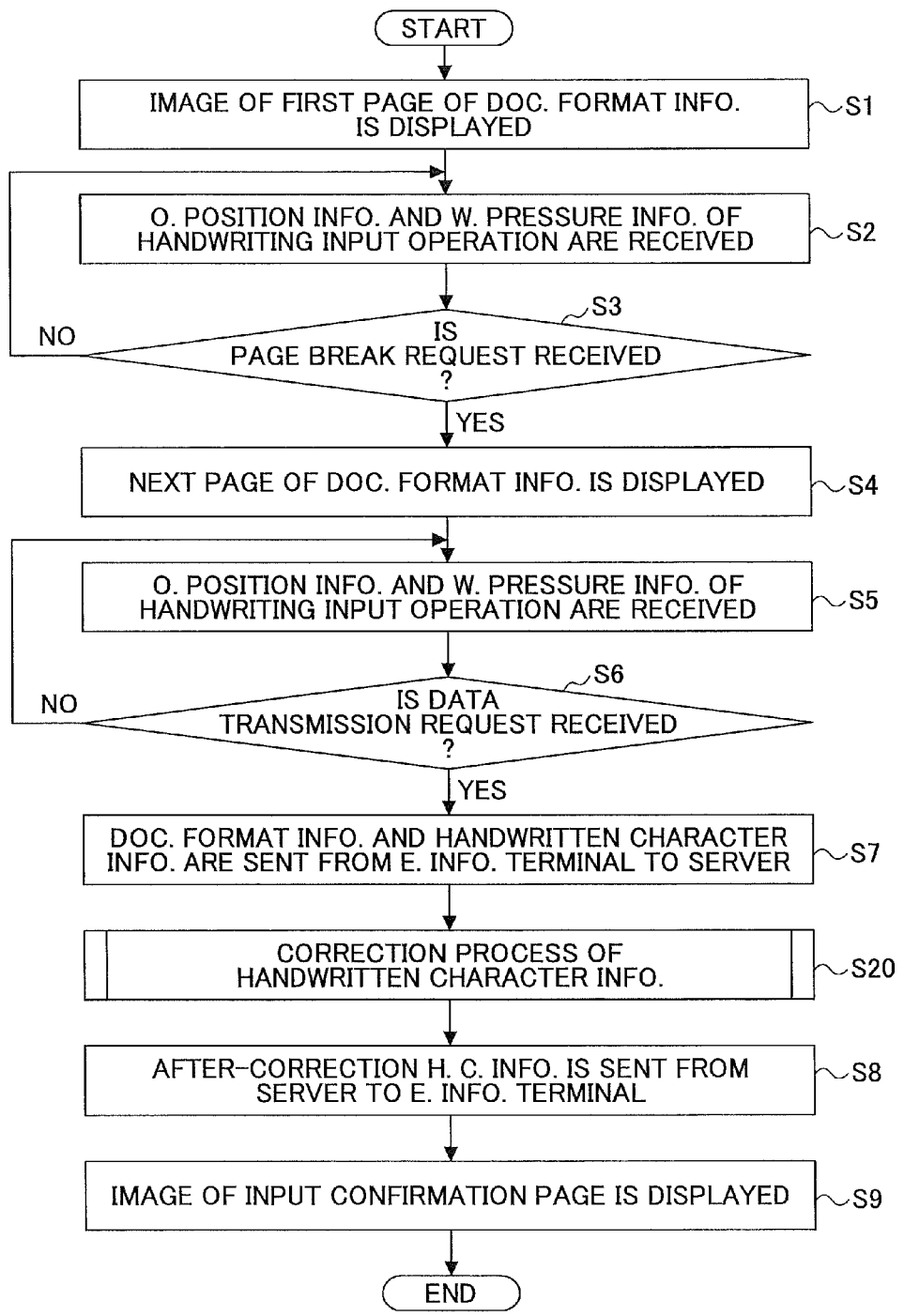
FIG. 5 is a flowchart for explaining the flow of operations of the electronic information terminal of the present embodiment when a handwriting input operation is performed by a user.

FIG. 5 is a flowchart for explaining the flow of operations of the electronic information terminal 10 of the present embodiment when handwriting input operation is performed by a user.

As shown in FIG. 5, the main control unit 13 of the electronic information terminal 10 displays a first page of a document format image based on the document format information on the image display unit 11c of the touch panel 11 as shown in FIG. 4A (S1). In the present embodiment, the case where the document format information contains 2 pages in total is described as an example. Alternatively, the document format information may contain 1 page or 3 or more pages. In the present embodiment, the size of the document format image displayed is in agreement with the screen size of the image display unit 11c of the touch panel 11. However, it is not necessarily required that the sizes are in agreement. For example, if the size of the document format image is larger than the screen size of the image display unit 11c of the touch panel 11, the document format image may be scrolled on the display screen.

The examples of the document format images shown in FIG. 4A and FIG. 4B are interview sheets in which a consultation person (user) in a medical institution is requested to enter personal data into character writing areas thereof.

The user performs the handwriting input operation to input data of his birth date (which is an answer to a first question item of the first page) to the character writing area K-1 using the electronic pen 17. Similarly, the user may perform the handwriting input operation to input data of his address and his telephone number (which are answers to other question items of the first page) to the character writing areas K-2 and K-3 using the electronic pen 17. When the user inputs the handwritten characters (the answers to the question items) to the character writing areas K-1, K-2 and K-3 using the electronic pen 17 in this manner, the input position information and the writing pressure information are sequentially stored in the input position information storage unit 14 and the writing pressure information storage unit 15 respectively (S2), and the images of the handwritten characters are drawn on the image display unit 11c of the touch panel 11 accordingly.

After the writing of the answers to the first page question items is finished, the user depresses the first button device 12A that functions as the page skip button (S3). Thereby, a page skip command is sent from the first button device 12A to the main control unit 13, and the main control unit 13 causes the image display unit 11c of the touch panel 11 to display a second page of the document format image based on the document format information thereon, as shown in FIG. 4B (S4). Similarly, the user performs the handwriting input operation to input his condition of disease and his preference (which are the answers to the second page question items) to the character writing areas K-4 and K-5 using the electronic pen 17. The user writes his name in the character writing area K-6 (which is the second page signature portion) using the electronic pen 17. According to such handwriting input operation, the input position information and the writing pressure information are sequentially stored in the input position information storage unit 14 and the writing pressure information storage unit 15 respectively (S5), and the handwritten characters are drawn on the image display unit 11c of the touch panel 11.

After the writing of the answers to all the question items and the signature portion is finished, the user depresses the third button device 12C which functions as the data transmission button (S6). Thereby, a data transmission command is sent from the third button device 12C to the main control unit 13. In response to this command, the main control unit 13 causes the communication unit 16 to transmit, to the server 30, the input position information and the writing pressure information (which are stored in the input position information storage unit 14 and the writing pressure information storage unit 15) as the associated information (the handwritten character information) of the document format information corresponding to the document format image currently displayed on the image display unit 11c of the touch panel 11 (S7).

When the document format information and its associated information (the handwritten character information) are received at the communication unit 31 of the server 30, the main control unit 32 of the server 30 sends the same to the correction processing unit 34 and causes the correction processing unit 34 to perform the correction process of the handwritten character information (S20). This correction process is the process for correcting the handwritten character information in a suitable manner, if the handwritten characters are input to the character writing areas K-1 to K-6 in an unsuitable manner, such as the cases in which the position of the input handwritten characters is projecting from the character writing areas K-1 to K-6, the posture of the input handwritten characters is inclined to the character writing areas K-1 to K-6, and the size of the input handwritten characters is too small or large relative to the character writing areas K-1 to K-6.

After the correction process is performed by the correction processing unit 34 and the after-correction handwritten character information is stored into the after-correction information storage unit 35, the main control unit 32 reads the after-correction handwritten character information from the information storage unit 35, and transmits the read information to the electronic information terminal 10 to which the before-correction handwritten character information has been transmitted (S8).

After the after-correction handwritten character information from the server 30 is received at the electronic information terminal 10, the main control unit 13 of the electronic information terminal 10 displays an image of an input confirmation page, instead of the second page document format image currently displayed, on the image display unit 11c of the touch panel 11 (S9).

An image of the handwritten characters is generated based on the after-correction handwritten character information received, instead of the before-correction handwritten character information stored in the input position information storage unit 14. The image of the input confirmation page is a combined image of the document format image and the after-correction handwritten character image. Reviewing the image of the input confirmation page being displayed, the user can check the contents of his input information. Moreover, at the time of checking the image of the input confirmation page, the user can view a corrected version of the image of the input handwritten characters in which the position, the inclination and the size of the handwritten characters originally input by the user are corrected.

In the foregoing embodiment, the image of the input confirmation page displayed at step S9 is a combined image of the document format image and the corrected image of the input handwritten characters in which the position, the inclination and the size of the originally input handwritten characters are corrected, which has been described as an example.

Figure 6:
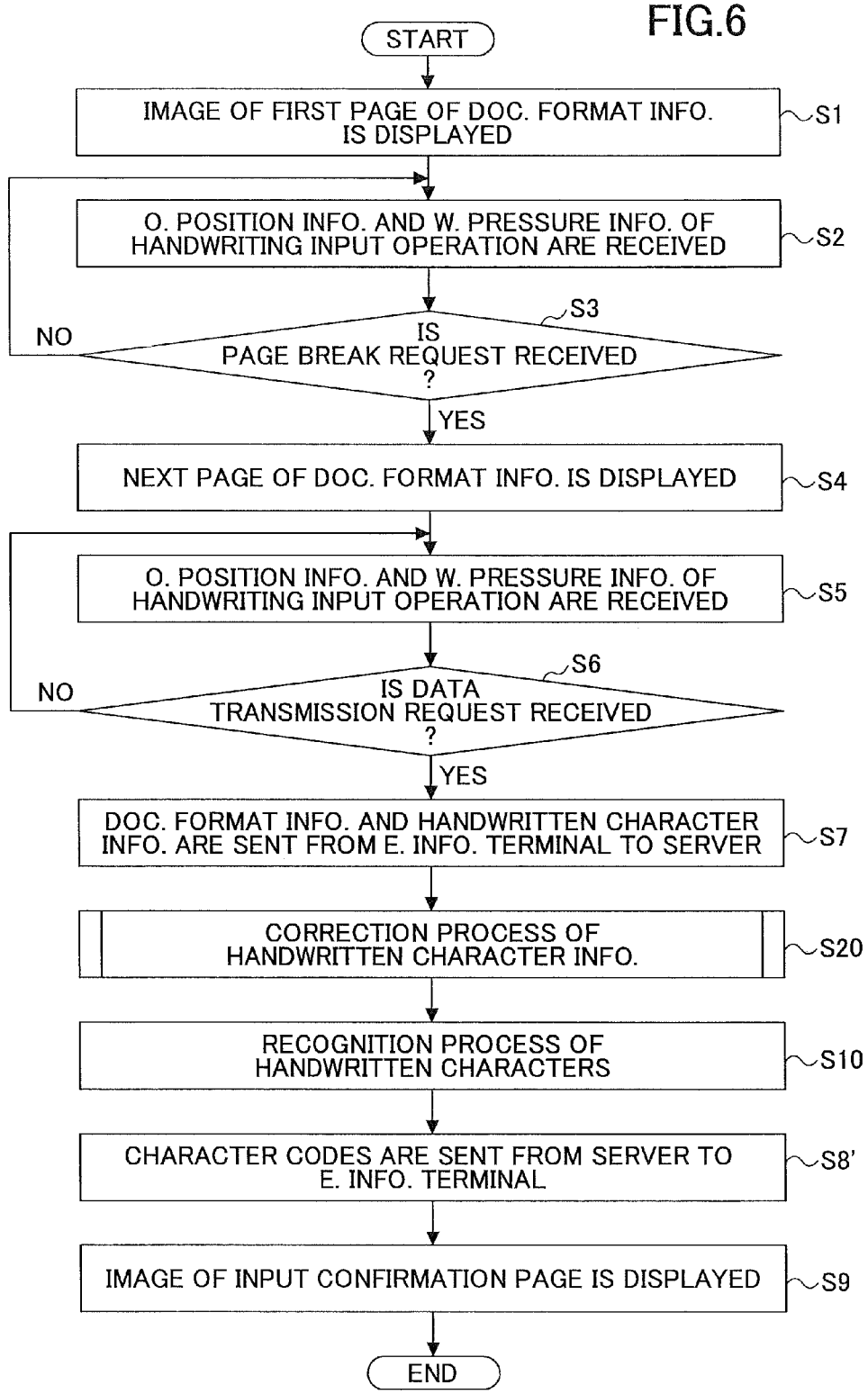
FIG. 6 is a flowchart for explaining a modification of the flow of operations of the electronic information terminal of the present embodiment when the handwriting input operation is performed by the user.

Alternatively, the image of the input handwritten characters may be displayed as a predetermined font image using the character codes obtained through the character recognition process by the server 30. In this case, as shown in FIG. 6, after the correction process is performed by the correction processing unit 34 (S20), the main control unit 32 of the server 30 reads the after-correction handwritten character information (which is output by the correction processing unit 34) from the after-correction information storage unit 35, sends the read information to the character recognition unit 36, and causes the character recognition unit 36 to perform the character recognition process (S10).

Subsequently, the main control unit 32 receives the character codes recognized through the character recognition process from the character code storage unit 37, and transmits the received character codes to the electronic information terminal 10, instead of the after-correction handwritten character information (S8').

In this case, an image of the handwritten characters is generated as the character image (font image) based on the character codes received from the server 30, instead of the before-correction handwritten character information stored in the input position information storage unit 14. The image of the input confirmation page is a combined image of the document format image and the character image (font image) which is drawn with a predetermined font based on the received character codes. Reviewing this image of the input confirmation page being displayed, the user can check the characters displayed as the font image in the contents of his input information.

Next, the correction process of the handwritten character information in the present embodiment will be described.

Figure 7:
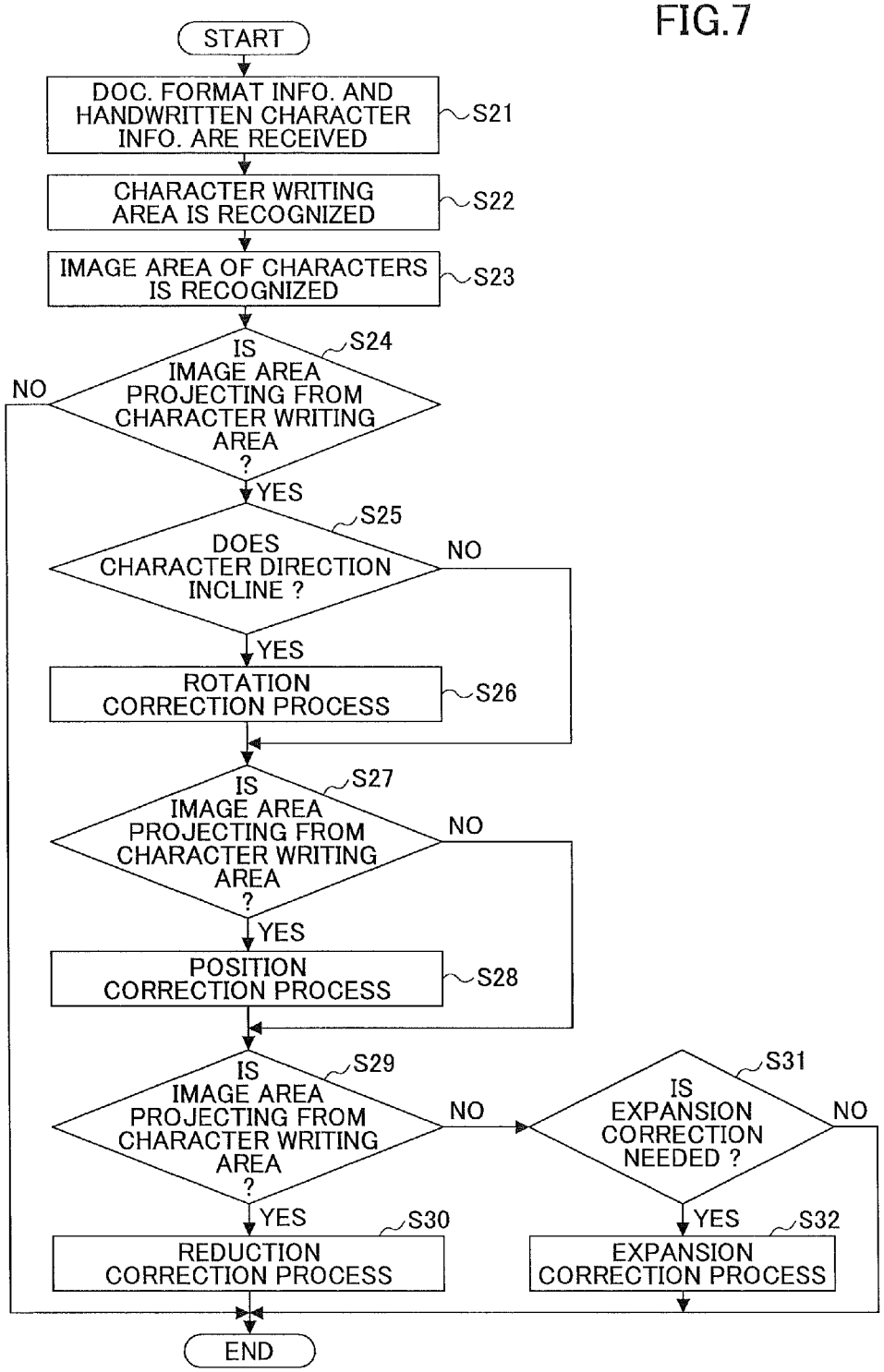
FIG. 7 is a flowchart for explaining the flow of correction processing of the handwritten character information in the present embodiment.

FIG. 7 is a flowchart for explaining the correction process of the handwritten character information in the present embodiment.

As shown in FIG. 7, the correction processing unit 34 of the server 30 receives, from the main control unit 32, the document format information and the handwritten character information associated thereto, which are transmitted from the electronic information terminal 10 (S21).

Subsequently, the correction processing unit 34 performs the process which recognizes the character writing area of a document format image and the image area of handwritten characters (S22, S23). Specifically, the character writing area of the document format image is recognized based on write enable area information included in the associated information of the document format information received from the electronic information terminal 10. This write enable area information is information for identifying each position and range of the character writing areas K-1 to K-6 in the document format image.

Figure 8:
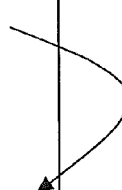
FIG. 8 is a diagram showing an example of a document format image which is used in an instance of asking a questionnaire.

On the other hand, the image area of the handwritten characters is recognized for each group of handwritten characters input to one of the character writing areas, by using the following method. For example, when recognizing the image area of the handwritten character corresponding to each of the character writing areas K-1 to K-6, first and second input position information sets having a difference of the Y coordinate values of first and second input positions of the handwritten characters exceeding a predetermined reference distance as indicated by the arrow in FIG. 8 are recognized as pertaining to mutually different handwritten character image areas, and first and second input position information sets having a difference of the Y coordinate values of first and second input positions of the handwritten characters not exceeding the reference distance are recognized as pertaining to the same handwritten character image area.

Figure 9:
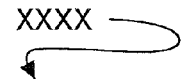
FIG. 9 is a diagram showing an example of a document format image which is used in an instance of filling in an application form for admission.

When it is expected that one row of handwritten characters is input to each character writing area, the following method may be used. First and second input position information sets having a difference of the X coordinate values of first and second input positions of the handwritten characters exceeding a predetermined reference distance as indicated by the arrow in FIG. 9 are recognized as pertaining to mutually different handwritten character image areas, and first and second input position information sets having a difference of the X coordinate values of first and second input positions of the handwritten characters not exceeding the reference distance are recognized as pertaining to the same handwritten character image area.

For example, when a time interval between a first time the first handwriting input operation is performed and a second time the second handwriting input operation is performed exceeds a predetermined reference period, the first and second input position information sets are recognized as pertaining to mutually different handwritten character image areas. When the time interval does not exceed the reference period, the first and second input position information sets are recognized as pertaining to the same handwritten character image area.

After the input position information pertaining to each handwritten character image area is recognized, the maximum and the minimum of X coordinate value of the input position information pertaining to the handwritten character image area, and the maximum and the minimum of the Y coordinate value are determined. Thereby, a circumscribed rectangle area of the group of the handwritten characters input to the character writing area is determined, and the rectangle area is recognized as the image area of the handwritten characters corresponding to the character writing area.

After the character writing area of the document format image and the image area of the handwritten characters are recognized, the correction processing unit 34 determines whether the image area of the handwritten characters projects from the character writing area of the document format image corresponding to the handwritten characters (S24). This determination may be made by detecting whether the maximum and the minimum of the X coordinate value and the maximum and the minimum of the Y coordinate value, which define the image area of the handwritten characters, are included in the range of the maximum and the minimum of the X coordinate value and the maximum and the minimum of the Y coordinate value, which define the character writing area.

When the image area of the handwritten characters is determined as not projecting from the character writing area (No of S24), it is determined that the character writing requirements are met. Then, the correction process is terminated.

On the other hand, when the image area of the handwritten character is determined as projecting from the character writing area (Yes of S24), the correction processing unit 34 determines whether the direction of the handwritten characters contained in the image area is inclined to a reference direction (which is, in the present embodiment, the horizontal direction parallel to the X-axis) predetermined for the corresponding character writing area (S25).

When it is determined at step S25 that the direction of the handwritten characters is inclined, it is determined that the character writing requirements are not met. In this case, the angle of inclination of the direction of the handwritten characters included in the image area to the reference direction is determined. Based on the angle of inclination, an angle of rotation of the handwritten character image area required to match the handwritten character direction with the reference direction is computed as an amount of rotating correction, and the process of rotating correction of the input position information pertaining to the handwritten character image area is performed using the computed amount of rotating correction (S26). In this regard, any of the known methods disclosed in Japanese Laid-Open Patent Publication Nos. 09-097311, 2000-003407, and 2002-175498 may be used as a method of identifying the direction of a character string including plural handwritten characters.

Subsequently, the correction processing unit 34 determines again whether the image area of the handwritten character projects from the character writing area (S27). When it is determined at step S27 that the image area projects from the character writing area (Yes of S27), it is determined that the character writing requirements are not met. In this case, the correction processing unit 34 computes the amount of deviation of a reference point in the image area of the handwritten characters from a predetermined reference point in the corresponding character writing area. An amount of movement of the handwritten character image area required for these reference points to coincide is computed as a position correction amount based on the amount of deviation, and the position correction process of the input position information pertaining to the handwritten character image area is performed using the computed position correction amount (S28).

Figure 10:
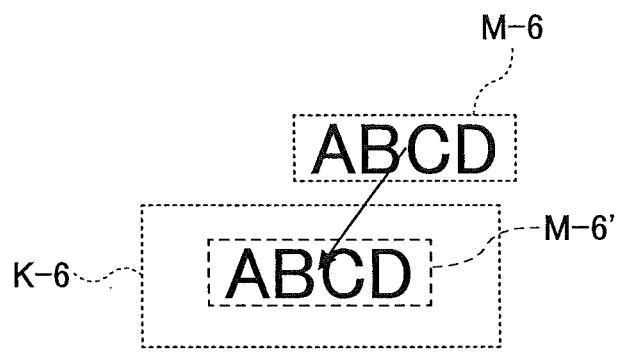
FIG. 10 is a diagram for explaining an example which corrects the position of an image of handwritten characters overflowing a document writing area.

For example, when the reference point of the handwritten character image area is set to the center position thereof, and the reference point of the character writing area is set as the center position thereof, the position "M-6" of the handwritten character image area projecting from the character writing area "K-6" as shown in FIG. 10 is corrected to the position "M-6'" indicated in FIG. 10 through the correction process of the present embodiment.

Figure 11:
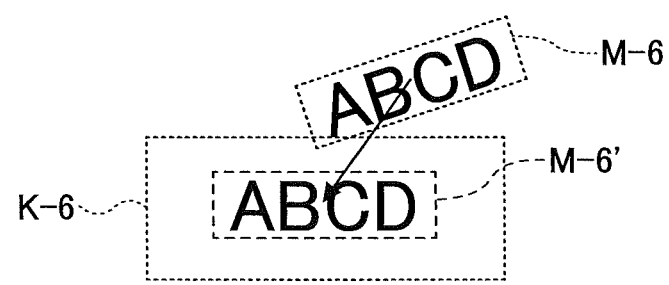
FIG. 11 is a diagram for explaining an example which corrects the inclination and position of an image of handwritten characters overflowing a document writing area.

For example, when the image of the handwritten characters is inclined as shown in FIG. 11, the position "M-6" of the handwritten character image area as shown in FIG. 11 is corrected to the position "M-6'" indicated in FIG. 11 as a result of the rotating correction process performed at the step S26 and the position correction process performed at the step S28.

Figure 12:
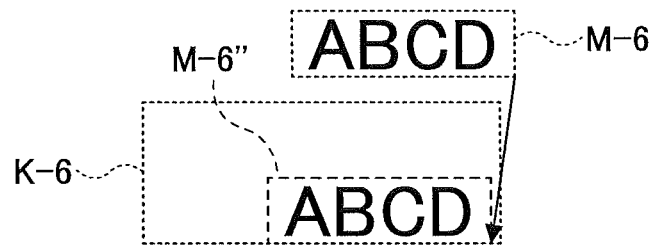
FIG. 12 is a diagram for explaining another example which corrects the position of an image of handwritten characters overflowing a document writing area.
Figure 13:
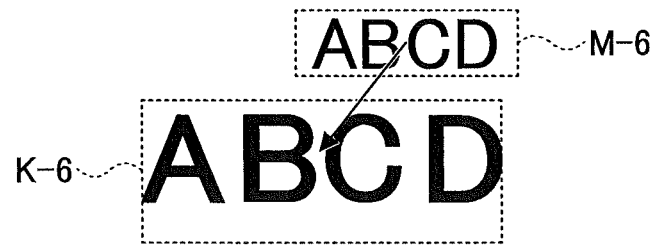
FIG. 13 is a diagram for explaining an example which corrects the position and size of an image of handwritten characters overflowing a document writing area.

For example, when the reference points of the handwritten character image area and the character writing area are set to the lower right corner point of each area (the Y coordinate of which is the minimum and the X coordinate of which is the maximum), the position "M-6" of the handwritten character image area projecting from the character writing area "K-6" as shown in FIG. 12 is corrected to the position "M-6'" indicated in FIG. 12 through the correction process of the present embodiment.

Subsequently, the correction processing unit 34 determines again whether the image area of the handwritten characters is projecting from the character writing area (S29). When it is determined at the step s29 that the image area is projecting (Yes of S29), it is determined that the character writing requirements are not met. In this case, the correction processing unit 34 computes an amount of projection of the portion of the handwritten character image area projecting from the character writing area. Based on the computed amount of projection, a reduction amount of the handwritten character image area required for reducing the handwritten character image area to be inscribed in the character writing area is computed as a reduction correction amount, and the process of the reduction correction of the input position information pertaining to the handwritten character image area is performed using the computed reduction correction amount (S30).

On the other hand, when it is determined at the step S29 that the image area is not projecting (No of S29), the correction processing unit 34 determines whether the expansion correction is needed (S31). In this step S31, the correction processing unit 34 computes a position difference amount of the outer edge of the character writing area and the outer edge of the handwritten character image area, and when the computed position difference amount is larger than a reference amount, it is determined that the character writing requirements are not met.

When it is determined at the step S31 that the expansion correction is needed, the correction processing unit 34 performs the expansion correction process. In this expansion correction process, based on the computed position difference amount, an amount of expansion of the handwritten character image area required for expanding the handwritten character image area to be inscribed in the character writing area is computed as an expansion correction amount. The process of the expansion correction of the input position information pertaining to the handwritten character image area is performed using the computed expansion correction amount (S32).

The input position information obtained after the correction process is performed is stored in the after-correction information storage unit 35. In the present embodiment, the input position information is encrypted and the encrypted data is stored. In the after-correction information storage unit 35, only the after-correction input position information which is the object of the correction process may be stored. Alternatively, the handwritten character information (the associated information of the document format information) including the after-correction input position information and the writing pressure information may be stored in the after-correction information storage unit 35. Alternatively, the image data including the handwritten character image derived from the after-correction input position information, and the document format image may be stored in the after-correction information storage unit 35. These may be applicable to the before-correction input position information stored in the before-correction information storage unit 33.

For the purpose of preventing falsification of data, the information stored in the before-correction information storage unit 33 and the after-correction information storage unit 35) may be associated with its hash value and the information and the hash value with the association may be stored. For example, when the information stored in these storage units 33 and 35 is stored in the form of the image data including the handwritten character image derived from the input position information and the document format image, a hash value is computed using a hash function based on the image data, and the hash value is associated with the image and the image data and the hash value with the association are stored.

In the document management system of the present embodiment, the electronic pen 17 is arranged to have a writing tool function. When a recording sheet (sheet material) S is overlaid on the image display surface of the electronic information terminal 10, the user may write handwritten characters on the recording sheet S using the electronic pen 17. Such usage is useful for the instance of receiving a signature of a recipient (user) from the certificate of delivery by parcel delivery service or mail.

As shown in FIG. 14, a slip paper (sheet material) S on which a document format image including a slip number and a signature portion K-7 is printed is overlaid on the display screen of the touch panel 11. In the display screen of the touch panel 11, the image which is the same as the document format image is displayed (the displayed image including a character writing area for inputting handwritten characters in the same position as in the slip paper). The user signs his name in the signature portion K7 of the slip paper using the electronic pen 17 having the writing tool function. While the user's name is written in the signature portion K7 of the slip paper S, the input position information and the writing pressure information that are in conformity with the locus of the handwritten characters are stored in the electronic information terminal 10. According to this example, the signature on the slip paper S and the electronization of the signature characters (handwritten characters) can be performed at once.

In the present embodiment, the case in which the image of the input confirmation page including the image of the handwritten characters after correction is displayed has been described. However, the mode of outputting the information of the handwritten characters after correction is not limited to the above embodiment. For example, in the instance of answering the questionnaire shown in FIG. 8, after many users answer plural question items Q1 and Q2 in the questionnaire, there may be the demand for performing data processing to extract only the answers of all the users to the question item Q2 "request". To meet the demand, the server 30 may be controlled to extract only the portion of the image data input to the character writing area corresponding to the portion of the question item Q2 from each user's image data (the image data containing the handwritten character image and the document format image) in the server 30. At this time, even if the image of the handwritten characters written by the user when answering the questionnaire projects from the character writing area, the image data in which the handwritten character image is corrected so as not to project from the character writing area are stored. Therefore, when extracting only the portion of the image data input to the character writing area corresponding to the portion of the question item Q2, the portion of the image data projecting from the character writing area can also be extracted appropriately.

In the mode of outputting the information of the handwritten characters after correction (in which only the image-data portion input to the character writing area corresponding to the portion of the question item Q2 is extracted, and the extraction result is displayed on the monitoring screen connected to the server 30 or transmitted from the communication unit 31 to another device connected to the server 30 via the communication network 20), it is unnecessary to display the handwritten character image after correction on the image display surface of the touch panel 11 of the electronic information terminal 10. In this case, the processing which transmits the information of the handwritten characters after correction from the server 10 to the electronic information terminal 10 may be omitted.

In the present embodiment, the example which transmits the after-correction input position information from the server 30 to the electronic information terminal 10 has been described. Alternatively, only the data of the correction amount may be transmitted from the server 30 to the electronic information terminal 10. In such a case, the processing which computes the after-correction input position information (which was performed by the correction processing unit 34 of the server 30) may be performed by the electronic information terminal 10 using the before-correction input position information and the correction amount stored in the input position information storage unit 14. According to such alternative embodiment, the amount of data transmitted from the server 30 to the electronic information terminal 10 can be reduced.

Thus, some or all of the processing which has been performed by the server 30 in the present embodiment may be performed by the electronic information terminal 10. If all of the processing performed by the server 30 is performed by the electronic information terminal 10, the use of the server 30 and the communication network 20 may be unnecessary, and the same advantages of the present embodiment can be offered in an environment in which the electronic information terminal 10 cannot communicate with other devices.

In the foregoing specification, embodiments of the invention have been described with reference to numerous specific details that may vary from implementation to implementation. The specification and drawings are, accordingly, to be regarded in an illustrative rather than a restrictive sense. With the foregoing specification, the present disclosure provides following items and advantageous effects for the respective items.

Item 1:

A handwritten character input device (such as a document management system) includes: a handwriting operation input unit (such as the input position detector unit 11a of the touch panel 11) which has an operation surface (image display surface) where handwriting input operation is performed by a user, and outputs input position information indicating an input position where the handwriting input operation is performed on the operation surface; an image display unit (such as the image display unit 11c of the touch panel 11) which displays a template image (such as a document format image) on the operation surface of the handwriting operation input unit, the template image including character writing area designation images (such as segment images) to designate character writing areas K-1 to K-6 where handwritten characters are to be input by the handwriting input operation; an input position information storage unit (such as the input position information storage unit 14 or the before-correction information storage unit 33) which receives from the handwriting operation input unit the input position information of handwritten characters where the handwriting input operation is performed and stores the input position information therein; a correction amount computation unit (such as the correction processing unit 34) which performs, when at least one of handwritten character characteristic values, including a position, an inclination and a size, of handwritten characters input to the designated character writing area by the handwriting input operation does not meet predetermined character writing requirements, a correction amount computation process which computes a correction amount of the at least one handwritten character characteristic value required to meet the character writing requirements; and a corrected handwritten character information output unit (such as the communication unit 31 of the server 30 or the image display unit 11c of the touch panel 11 of the electronic information terminal 10) which outputs information of after-correction handwritten characters generated based on the correction amount computed by the correction amount computation unit, the at least one handwritten character characteristic value of the after-correction handwritten characters meeting the character writing requirements.

According to this handwritten character input device, even if the handwritten characters are input to the character writing area in an unsuitable manner, it is possible to deal with information of the handwritten characters in a manner similar to a case where the handwritten characters are input in a suitable manner.

Item 2:

The handwritten character input device of item 1 wherein the handwriting operation input unit is configured to output an input position of handwritten characters on the operation surface when the user performs the handwriting input operation to input the handwritten characters to a sheet member (such as the slip paper S) overlaid on the operation surface, using a writing tool (such as the electronic pen 17 having a writing tool function).

According to this handwritten character input device, the entry to the sheet member and the electronization of input handwritten characters can be performed at once.

Item 3:

The handwritten character input device of item 1 wherein the corrected handwritten character information output unit is configured to cause the image display unit to display on the operation surface of the handwriting operation input unit an image of the after-correction handwritten characters generated based on the correction amount computed by the correction amount computation unit, together with the template image.

According to this handwritten character input device, even if the input handwritten characters project from the character writing area, a combined image of the template image and the image of the after-correction handwritten characters in which the projecting handwritten character portion is corrected can be displayed.

Item 4:

The handwritten character input device of item 1 wherein the corrected handwritten character information output unit is configured to extract after-correction handwritten character information corresponding to a specific character writing area (such as the question item Q2) of the template image from among the after-correction handwritten character information generated based on the correction amount computed by the correction amount computation unit, and to output the after-correction handwritten character information corresponding to the specific character writing area.

According to this handwritten character input device, even if the input handwritten characters project from the specific character writing area, it is possible to extract handwritten character information including the projecting handwritten character portion.

Item 5:

The handwritten character input device of item 1 wherein the template image includes plural character writing area designation images which designate plural character writing areas K-1 to K-6, respectively, and the corrected handwritten character information output unit is configured not to output the after-correction handwritten character information for some predetermined character writing areas (such as the area K-6) among the plural character writing areas.

If information of handwritten characters (signature) signed by a user is corrected, original information is lost and the importance of the information handwritten characters may fall. In such a case, the corrected handwritten character information output unit is configured so that information of after-correction handwritten characters may not be output even if the input handwritten characters overflow such character writing areas. According to this handwritten character input device, the original information of the handwritten characters input to such character writing areas can be retained.

Item 6:

The handwritten character input device of item 1 further includes: an input position information correction unit (such as the correction processing unit 34) which corrects the input position information stored in the input position information storage unit based on the correction amount computed by the correction amount computation unit, so that the at least one handwritten character characteristic value meets the character writing requirements; and an after-correction input position information storage unit (such as the after-correction information storage unit 35) which stores after-correction input position information corrected by the input position information correction unit.

According to this handwritten character input device, information of the after-correction handwritten characters can be managed with the after-correction input position information. In this case, the amount of data to manage is smaller than a case where information of the after-correction handwritten character is managed with image data of after-correction handwritten characters.

Item 7:

The handwritten character input device of item 6 wherein the input position information before the correction is held in the input position information storage unit even if the after-correction input position information is stored in the after-correction input position information storage unit.

According to this handwritten character input device, the original information of handwritten characters can be secured.

Item 8:

The handwritten character input device of item 7 wherein the input position information before the correction and the after-correction input position information are encrypted for prevention of falsification (such as the process of computing hash values and adding the hash values being performed) and stored in the input position information storage unit and the after-correction input position information storage unit respectively.

According to this handwritten character input device, falsification of information of handwritten characters can be prevented.

Item 9:

The handwritten character input device of item 1 further includes: a determining unit which determines whether the corrected handwritten character information output unit is output the information of the after-correction handwritten characters, wherein the corrected handwritten character information output unit is configured to operate according to a result of the determination by the determining unit.

According to this handwritten character input device, whether the information of the after-correction handwritten characters is output or not can be determined according to a selection of a user of the handwritten character input device, and the convenience of the user can be improved.

Item 10:

The handwritten character input device of item 1 wherein at least the handwriting operation input unit and the image display unit are arranged in the electronic information terminal 10 which is operated by a user, and at least the correction amount computation unit is arranged in a remote device (such as the server 30) connectable to the electronic information terminal 10 via the communication network 20 to perform communications therewith.

According to this handwritten character input device, it is unnecessary for the electronic information terminal 10 (which is operated by the user) to include the correction amount computation unit which must have comparatively heavy processing loads, and it is possible to provide an inexpensive electronic information terminal.

Item 11:

A remote device (such as the server 30) which is connectable to the electronic information terminal 10 via the communication network 20 to perform communications therewith, includes: a reception unit (such as the communication unit 31) which receives input position information sent from the electronic information terminal 10 via the communication network; an input position information storage unit (such as the before-correction information storage unit 33) which stores the input position information received by the reception unit; and a correction amount computation unit (such as the correction processing unit 34) which performs, when at least one of handwritten character characteristic values, including a position, an inclination and a size, of handwritten characters input to a designated character writing area of a template image by handwriting input operation of a user does not meet predetermined character writing requirements, and a correction amount computation process that computes a correction amount of the at least one handwritten character characteristic value required to meet the character writing requirements.

According to this remote device, it is unnecessary for the electronic information terminal 10 (operated by the user) to include the correction amount computation unit which must have comparatively heavy processing loads, and it is possible to provide an inexpensive electronic information terminal.

Item 12:

An electronic information terminal 10 which is connectable to the remote device of item 11 via the communication network 20 to perform communications therewith, includes: a handwriting operation input unit (such as the input position detector unit 11a of the touch panel 11) which has an operation surface (the image display surface) where a handwriting input operation is performed by a user, and outputs input position information indicating an input position where the handwriting input operation is performed on the operation surface; an image display unit (such as the image display unit 11c of the touch panel 11) which displays a template image on the operation surface of the handwriting operation input unit, the template image (such as the document format image) including character writing area designation images (such as the segment images) to designate the character writing areas K-1 to K-6 where handwritten characters are to be input by the handwriting input operation; an input position information storage unit (such as the input position information storage unit 14) which receives from the handwriting operation input unit the input position information of handwritten characters where the handwriting input operation is performed and stores the input position information therein; a transmitting unit (such as the communication unit 16) which transmits the input position information stored in the input position information storage unit to the remote device via the communication network 20; and a reception unit (such as the communication unit 16 which receives data of the correction amount computed by the correction amount computation unit of the remote device via the communication network 20, wherein the image display unit configured to display on the operation surface of the handwriting operation input unit an image of after-correction handwritten characters generated based on the input position information stored in the input position information storage unit and the correction amount received by a reception unit, so that the at least one handwritten character characteristic value meets the character writing requirements, together with the template image.

According to this electronic information terminal 10, an image of the handwritten characters corrected based on the correction amount computed by the correction amount computation process performed by the remote device is displayed on the operation surface of the electronic information terminal 10, the information transmitted from the remote device to the electronic information terminal 10 is only the data of the correction amount, and the amount of transmitted data can be reduced.

According to the present disclosure, even if the handwritten characters are input to the character writing area in an unsuitable mode, the above-mentioned problems according to the related art can be reduced or resolved.

The handwritten character input device according to the present disclosure is not limited to the specifically disclosed embodiments, and variations and modifications may be made without departing from the scope of the present disclosure.

The present application is based upon and claims the benefit of priority of Japanese Patent Application No. 2011-286578, filed on Dec. 27, 2011, the contents of which are incorporated herein by reference in their entirety.

What is claimed is:

1. A handwritten character input device, comprising:
a handwriting operation input unit having an operation surface where a handwriting input operation is performed by a user, and configured to output input position information indicating an input position where the handwriting input operation is performed on the operation surface;
an image display unit configured to display a template image on the operation surface of the handwriting operation input unit, the template image including a character writing area designation image to designate a character writing area where handwritten characters are to be input by the handwriting input operation;
an input position information storage unit configured to receive, from the handwriting operation input unit, the input position information of the handwritten characters where the handwriting input operation is performed, and to store the input position information therein;
a correction amount computation unit configured to perform, when at least one of handwritten character characteristic values, including a position, an inclination and a size, of handwritten characters input to the designated character writing area by the handwriting input operation does not meet predetermined character writing requirements, a correction amount computation process that computes a correction amount of the at least one handwritten character characteristic value required to meet the character writing requirements; and
a corrected handwritten character information output unit configured to output information of after-correction handwritten characters generated based on the correction amount computed by the correction amount computation unit, the at least one handwritten character characteristic value of the after-correction handwritten characters meeting the character writing requirements.

2. The handwritten character input device of claim 1, wherein the handwriting operation input unit is configured to output an input position of handwritten characters on the operation surface when the user performs the handwriting input operation to input the handwritten characters onto a sheet member overlaid on the operation surface, using a writing tool.

3. The handwritten character input device of claim 1, wherein the corrected handwritten character information output unit is configured to cause the image display unit to display, on the operation surface of the handwriting operation input unit, an image of the after-correction handwritten characters generated based on the correction amount computed by the correction amount computation unit, together with the template image.

4. The handwritten character input device of claim 1, wherein the corrected handwritten character information output unit is configured to extract after-correction handwritten character information corresponding to a specific character writing area of the template image from among the after-correction handwritten character information generated based on the correction amount computed by the correction amount computation unit, and to output the after-correction handwritten character information corresponding to the specific character writing area.

5. The handwritten character input device of claim 1, wherein the template image includes plural character writing area designation images which designate plural character writing areas, respectively, and the corrected handwritten character information output unit is configured not to output the after-correction handwritten character information for some predetermined character writing areas among the plural character writing areas.

6. The handwritten character input device of claim 1, further comprising:
an input position information correction unit configured to correct the input position information stored in the input position information storage unit, based on the correction amount computed by the correction amount computation unit, so that the at least one handwritten character characteristic value meets the character writing requirements; and
an after-correction input position information storage unit configured to store after-correction input position information corrected by the input position information correction unit.

7. The handwritten character input device of claim 6, wherein the input position information before the correction is held in the input position information storage unit even if the after-correction input position information is stored in the after-correction input position information storage unit.

8. The handwritten character input device of claim 7, wherein the input position information before the correction and the after-correction input position information are encrypted for prevention of falsification and stored in the input position information storage unit and the after-correction input position information storage unit, respectively.

9. The handwritten character input device of claim 1, further comprising:
a determining unit configured to determine whether the corrected handwritten character information output unit is to output the information of the after-correction handwritten characters,
wherein the corrected handwritten character information output unit is configured to operate according to a result of the determination by the determining unit.

10. The handwritten character input device of claim 1, wherein at least the handwriting operation input unit and the image display unit are arranged in an electronic information terminal which is operated by the user, and at least the correction amount computation unit is arranged in a remote device which is connectable to the electronic information terminal via a communication network to perform communications therewith.

11. A remote device which is connectable to an electronic information terminal via a communication network to perform communications therewith, the remote device comprising:
a reception unit configured to receive input position information which is sent from the electronic information terminal via the communication network;
an input position information storage unit configured to store the input position information received by the reception unit; and
a correction amount computation unit configured to perform, when at least one of handwritten character characteristic values, including a position, an inclination and a size, of handwritten characters input to a designated character writing area of a template image by a handwriting input operation of a user does not meet predetermined character writing requirements, a correction amount computation process that computes a correction amount of the at least one handwritten character characteristic value required to meet the character writing requirements.

12. An electronic information terminal which is connectable to the remote device as claimed in claim 11 via the communication network to perform communications therewith, comprising:
a handwriting operation input unit having an operation surface where a handwriting input operation is performed by a user, and configured to output input position information indicating an input position where the handwriting input operation is performed on the operation surface;
an image display unit configured to display a template image on the operation surface of the handwriting operation input unit, the template image including a character writing area designation image to designate a character writing area where handwritten characters are to be input by the handwriting input operation;
an input position information storage unit configured to receive, from the handwriting operation input unit, the input position information of the handwritten characters where the handwriting input operation is performed, and to store the input position information therein;
a transmitting unit configured to transmit the input position information of the handwritten characters stored in the input position information storage unit, to the remote device via the communication network; and
a reception unit configured to receive data of the correction amount computed by the correction amount computation unit of the remote device via the communication network;
wherein the image display unit is configured to display on the operation surface of the handwriting operation input unit an image of after-correction handwritten characters generated based on the input position information stored in the input position information storage unit and the correction amount received by the reception unit, so that the at least one handwritten character characteristic value of the after-correction handwritten characters meets the character writing requirements, together with the template image.

* * * * *